United States Patent
Chan et al.

(10) Patent No.: US 9,241,197 B2
(45) Date of Patent: Jan. 19, 2016

(54) SYSTEM AND METHOD FOR VIDEO DELIVERY OVER HETEROGENEOUS NETWORKS WITH SCALABLE VIDEO CODING FOR MULTIPLE SUBSCRIBER TIERS

(71) Applicants: Douglas S. Chan, San Jose, CA (US); Xiaoqing Zhu, Austin, TX (US); Flavio Bonomi, Palo Alto, CA (US)

(72) Inventors: Douglas S. Chan, San Jose, CA (US); Xiaoqing Zhu, Austin, TX (US); Flavio Bonomi, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 118 days.

(21) Appl. No.: 13/750,555

(22) Filed: Jan. 25, 2013

(65) Prior Publication Data
US 2014/0211681 A1 Jul. 31, 2014

(51) Int. Cl.
*H04N 21/6405* (2011.01)
*H04N 21/2343* (2011.01)
*H04N 21/63* (2011.01)
*H04N 21/6408* (2011.01)

(52) U.S. Cl.
CPC ... *H04N 21/6405* (2013.01); *H04N 21/234327* (2013.01); *H04N 21/631* (2013.01); *H04N 21/6408* (2013.01)

(58) Field of Classification Search
None
See application file for complete search history.

(56) References Cited

U.S. PATENT DOCUMENTS

2010/0260259 A1* 10/2010 Kimmich et al. ........ 375/240.07
2014/0201329 A1* 7/2014 Himayat et al. ............ 709/219

OTHER PUBLICATIONS

Yang, et al., "Bandwidth Efficient Video Multicasting in Multiradio Multicellular Wireless Networks," IEEE Transactions on Mobile Computing, vol. 7, No. 2, Feb. 2008, pp. 275-288; http://ntur.lib.ntu.edu.tw/bitstream/246246/141985/1/59.pdf.
Ife Hsu, "Are You Frustrated with Inconsistent Video Quality and Uneven Wait Time for Video Response?," Intel Labs Blog, Sep. 13, 2011, 2 pages; http://blogs.intel.com/intellabs/2011/09/13/are_you_frustrated_with_incons/.
Schwarz, et al. "Overview of the Scalable Video Coding Extension of the H.264/AVC Standard," IEEE Transactions on Circuits and Systems for Video Technology, vol. 17, No. 9, Sep. 2007, pp. 1103-1120; http://ip.hhi.de/imagecom_G1/assets/pdfs/Overview_SVC_IEEE07.pdf.
Wikipedia, the free encyclopedia. Scalable Video Coding, [retrieved and printed from the Internet Dec. 13, 2012], 4 pages; http://http://en.wikipedia.org/wiki/Scalable_Video_Coding.

* cited by examiner

*Primary Examiner* — Charles C Jiang
*Assistant Examiner* — George Atkins, Jr.
(74) *Attorney, Agent, or Firm* — Patent Capital Group (57) ABSTRACT

A method is provided in one example and can include receiving a source data stream, generating a base layer sub-stream from the source data stream, and generating an enhancement layer sub-stream from the source data stream. The method further includes communicating the base layer sub-stream to a client device using a first communication protocol, and communicating the enhancement layer sub-stream to the client device using a second communication protocol. In a particular example, the one-to-many communication protocol is a multicast communication protocol and the second communication protocol is a unicast communication protocol. In another example, the base layer sub-stream is sent to the client device via a first network connection and the enhancement layer sub-stream is sent to the client device via a second network connection.

26 Claims, 5 Drawing Sheets

SYSTEM AND METHOD FOR VIDEO DELIVERY OVER HETEROGENEOUS NETWORKS WITH SCALABLE VIDEO CODING FOR MULTIPLE SUBSCRIBER TIERS

TECHNICAL FIELD

This disclosure relates in general to the field of communications and, more particularly, to providing video delivery over heterogeneous networks with scalable video coding for multiple subscriber tiers.

BACKGROUND

As the adoption of portable computing devices, such as smartphones and tablets, by users has increased, there has been a proliferation of wireless heterogeneous networking (HetNet) devices in the field. Typically, these computing devices can choose to either access Internet services through WiFi or cellular network (3G/4G) interfaces. For example, a particular user device may have an 802.11a/b/g/n and a cellular interface such as a 3G high-speed downlink packet access (HSPDA) or 4G LTE interface. Since accessing the Internet through the cellular network may incur charges on the user's data plan, users typically switch to using a WiFi connection when it becomes available for no cost or for a cheaper fee. Additionally, there are many use cases in which cellular service providers also want to offload the user's data usage from their base stations to local WiFi access points (AP) in order to free up capacity within their cellular networks. Such use cases are especially appealing for crowded environments, for example during a sporting event or a rock music concert in a stadium, or during rush hour in a subway or train station. If users in these environments are accessing bandwidth hungry content, such as streaming video, then there can be strain on the cellular network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and can include receiving a source data stream (which can include any suitable content, data, etc.), generating a base layer sub-stream from the source data stream, and generating an enhancement layer sub-stream from the source data stream. The method can further include communicating the base layer sub-stream to a client device using a first communication protocol, and communicating the enhancement layer sub-stream to the client device using a second communication protocol.

In a particular embodiment, the one-to-many communication protocol is a multicast communication protocol. In still another particular embodiment, the second communication protocol is a unicast communication protocol. In still other particular embodiments, the base layer sub-stream is sent to the client device via a first network connection and the enhancement layer sub-stream is sent to the client device via a second network connection. In still another particular embodiment, the first network connection can include a WiFi connection. In still another particular embodiment, the second network connection can include a cellular network connection. In another particular embodiment, the source data stream can include a video stream. In still another particular embodiment, a scalable video coding technique is used to generate the base layer sub-stream and the enhancement layer sub-stream from the received video stream. In a particular embodiment, the method can further include receiving a subscription request to the enhancement layer sub-stream from the client device.

EXAMPLE EMBODIMENTS

Figure 1:
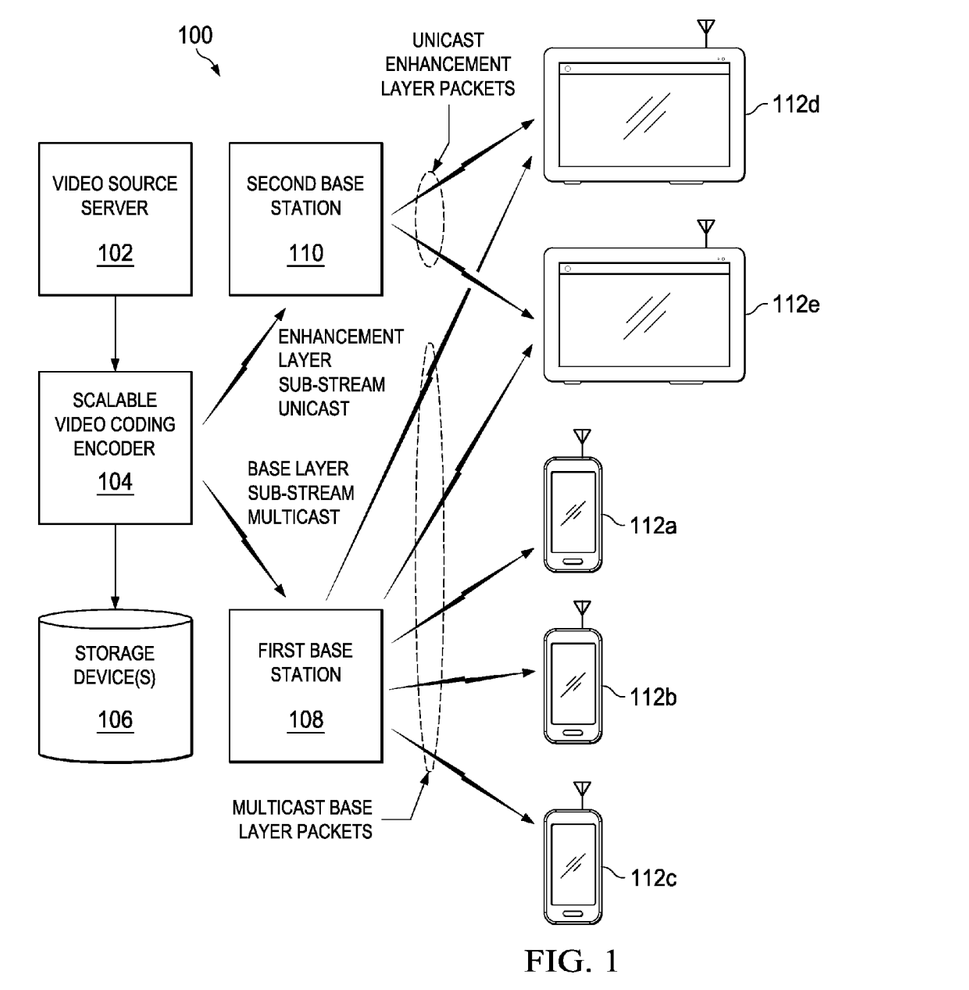
FIG. 1 is a simplified block diagram of a communication system for providing video delivery over heterogeneous networks with scalable video coding in a network environment.

Referring now to FIG. 1, FIG. 1 is a simplified block diagram of a communication system 100 for providing video delivery over heterogeneous networks with scalable video coding in a network environment. FIG. 1 can include a video source server 102 that is in communication with a scalable video coding (SVC) encoder 104. SVC encoder 104 is further in communication with one or more storage device(s) 106. SVC encoder 104 is in still further in communication with a first base station 108 and a second base station 110. Communication system 100 can further include client devices 112*a*-112*e*, each of which is in communication with one or more of first base station 108 and second base station 110. Client devices 112*a*-112*e* may include any wireless device capable of receiving wireless signals from heterogeneous networks such as a mobile phone, smartphone (inclusive of Android™ phones, i-Phones™), tablet device (e.g., i-Pad™), Google Nexus™, Microsoft Surface™, personal computer, server, video processing components, laptop computer (inclusive of any type of notebook), any type of touch-enabled input device, etc. In a particular embodiments, client devices 112*a*-112*c* are smartphone devices and client devices 112*d*-112*e* are tablet devices having larger screen that those of client devices 112*a*-112*c*.

The use of wireless devices in wireless heterogeneous networks (HetNets) has proliferated. Typically, these wireless devices can choose to either access Internet services through a WiFi or cellular network (3G/4G) interface. Since accessing the Internet through the cellular network may incur charges on the user's data plan, users typically switch to using a WiFi connection when it becomes available for no cost or for a cheaper fee. Additionally, there are many use cases in which cellular service providers (SPs) also want to offload the user's data usage from their base stations to local WiFi access points (AP) in order to free up capacity within their cellular networks. Such use cases are especially appealing for crowded environments, for example during a sporting event or a rock music concert in a stadium, or during rush hour in a subway or train station.

If users in these environments are accessing bandwidth hungry content, such as streaming video, there may be a strain on the cellular network. Video streaming is often a preferred application in such environments. For instance, in stadium WiFi deployments sports fans are often streaming a live video broadcast of a game or other event on their portable wireless devices. Frequently, they may be watching an instant replay of actions that have previously occurred on the field. Similarly, at music concerts, concert-goers may often look for video of the concert stage from different angles.

Unicast transmission involves the sending of data to a single destination, such as a single user device, in a one-to-one manner. In contrast, multicast transmission or broadcasting involves the sending of the same data to multiple destinations, such as a number of user devices, in a one-to-many manner. Multicast is a bandwidth-conserving technology that reduces traffic by simultaneously delivering data to multiple devices. It is usually not viable to send video to each user using unicast via a cellular network link, and such high bandwidth demanding streaming applications may even put a strain on the WiFi network as well. Since a multicast or broadcast transmission may cater to users with various channel conditions and distances from the wireless access point (AP), the AP may have to use a lower data rate in order to reach the users in a robust manner. As a result, the video's quality cannot be too high in order for the multicast link to be robustly sustained. In addition, it is often not feasible to convert WiFi multicast-to-unicast because the user population is too dense. Since the quality of the video broadcasted may have to be reduced to compromise for robust transmissions, this may result in a degraded quality of experience (QoE) for the users.

In accordance with various embodiments, the heterogeneous network capabilities of the users' wireless devices is used to target this video broadcasting/multicasting problem by leveraging the technique of Scalable Video Coding (SVC) in the heterogeneous network environment. SVC enables the encoding of a high-quality video stream containing more than one subset streams. Typically, with SVC there is a base layer sub-stream that represents a basic quality of a video signal and one or more additional enhancement layer sub-streams that provide for improved video quality of the video signal when combined with the base layer sub-stream. The base layer is necessary for the video stream to be decoded, and enhancement layers are applied to improve stream quality. In particular embodiments, the enhancement layer is a stream or source of video information that is used to improve or enhance the resolution or appearance of the underlying base layers. In a particular embodiment, the first enhancement layer depends on the base layer and each enhancement layer n+1 depends on its subordinate layer n, and thus can only be applied if n was already applied. Note that even though the embodiment of FIG. 1 may be described as transporting a video stream to user client devices 112a-112e, it should be understood that other embodiments may be directed toward multiplexing multiple different video streams within the same communication system.

When a decoder is provided with sub-streams (i.e., the base layer sub-stream and the one or more enhancement sub-streams) video can be rendered at the highest quality. Additionally, a basic quality of the video can still be decoded by the decoder when the decoder only receives the base layer sub-stream. In accordance with various embodiments, the video quality can be scaled in terms of spatial resolution (e.g., picture size), temporal resolution (e.g., frame rate), or SNR quality (e.g., per-picture visual quality). An important property of SVC to note is that the size of the base layer sub-stream can be made quite small such that a low video bit rate is sufficient to provide a basic video quality stream. A particular example of SVC is described in the scalable extension of the H.264/MPEG-4 AVC video compression standard developed jointly by ITU-T and ISO/IEC JTC 1.

Some users may not need, desire, or have the capability to watch the video at the highest quality, and such users may be provided only with the base layer sub-stream of the SVC encoded video. In particular embodiments, a base layer sub-stream of an SVC-coded video stream is multicast to such users via a first network connection, such as WiFi, which may be free of charge or cheaper for the users in a particular deployment. Other uses may wish to watch the video at a higher or the highest quality. Such users may be provided with one or more enhancement layer sub-streams in addition to the base layer sub-stream. In some situations, such users may be willing to pay the cost for the higher quality. In various embodiments, for users who want a high-quality video, additional enhancement layer sub-streams are transmitted via unicast over a second network connection, such as cellular network link. The decoders of the user devices may then combine these enhancement layer sub-streams received from the cellular link unicast with the base layer sub-stream received from WiFi multicast, to render the final video in higher quality video.

Because the data rate of the base layer sub-stream may be typically fairly low, a WiFi access point (AP) can employ a low and robust modulation and coding rate to multicast this stream reliably to the user client devices 112a-112e to ensure that users will at least receive the base layer sub-stream. Moreover, subscribers to higher quality video can also rely on the base layer sub-stream for proper decoding of their enhancement layer sub-streams for which they have subscribed and may have paid.

In densely populated environments, it may be exorbitantly expensive, if at all feasible, to stream high-quality video to interested users via unicast. In accordance with various embodiments, parallel wireless links in heterogeneous networks and the robustness of WiFi at low data rates may be exploited. In particular embodiments, multicasting or broadcasting a base layer sub-stream via the WiFi link of a scalably-encoded video stream provides reliability at a low cost to users, ensuring the delivery of a basic low-quality version of the video. For users interested in viewing high-quality video, additional enhancement-layer sub-streams of the same video are unicast to their client devices via a cellular link, for which the users may have to bear additional data transport costs. In particular embodiments, each user may be provided with the flexibility to choose the number of enhancement layer sub-streams the user wishes to receive (based on his own demand).

It should be understood that although various embodiments described herein are directed to video data streaming, the principles described herein may be applied to any scalable encoded data over heterogeneous networks (HetNets) in which a base layer is transmitted over a first network connection using a multicast protocol and one or more enhancement layers are transmitted over a second network connection using a unicast protocol. In a particular embodiment, a femtocell product solution, which is a WiFi access point with a cellular network interface, may be employed to perform the functions of first base station 108 and second base station 110. In addition, it should be understood that the embodiments described herein are not limited to the scenario of video multicasting, but may be effectively applicable for video broadcasting or any other suitable data transmission as well.

Referring again to FIG. 1, video source server 102 is configured to provide a source video stream to SVC encoder 104. In a particular embodiment, the source video stream is a live video stream such as a video stream captured from a sporting event or other live event. In still other embodiments, the source video stream may be a previously recorded or previously generated video stream obtained from a prior event. In still other particular embodiments, the source video stream may be a digitally encoded video stream such as Moving Picture Experts Group (MPEG), MPEG-2, MPEG-4, or H.264 encoded video stream. SVC encoder 104 generates a base layer sub-stream and an enhancement layer sub-stream from the received video stream using SVC encoding techniques. Although the particular embodiment illustrated as using a base layer sub-stream and a single enhancement layer sub-stream, it should be understood that in other embodiments that two or more enhancement layer sub-streams may be used to provide multiple levels of enhancement to a base video signal. In some embodiments, the base layer sub-stream and enhancement layer sub-stream(s) may be stored within storage device(s) 106. Additionally, it should be noted that any suitable data (in any appropriate format) can be provided In the embodiment illustrated in FIG. 1, client devices 112a-112e each may be configured to receive signals from first base station 108 and second base station 110. In a particular embodiment, first base station 108 is a WiFi access point (AP) and second base station 110 is a cellular network base station supporting 3G high-speed downlink packet access (HSPDA) or 4G connections with client devices 112a-112e. In the embodiment of FIG. 1, SVC encoder 104 is configured to send the base layer sub-stream to first base station 108 as a multicast transmission. First base station 108 is configured to broadcast the base layer sub-stream as multicast base layer sub-stream packets to each of client devices 112a-122e using a WiFi link. As previously discussed, use of a WiFi link is often free of charge to users at a location. In a particular embodiment, after the base layer sub-stream is transported to the WiFi portion of communication network 100, one or more APs, such as first base station 108, can begin transmitting it to a designated multicast address.

In addition, SVC encoder 104 transports the enhancement layer sub-stream to second base station 110 via a unicast transmission, and second base station 110 is ready to transmit the enhancement layer sub-stream via the cellular network, to those users that request it. In a particular embodiment, the enhancement layer sub-stream may be represented by another designated IP address. In various embodiments, the base layer sub-stream and the enhancement layer sub-stream are transmitted substantially simultaneously such that under normal circumstances the frames of the video received at client devices 112a-112e are in synchronization.

In the embodiment illustrated in FIG. 1, client devices 112d-112e are each configured to receive the enhancement layer sub-stream as well as the base layer sub-stream by user subscription. Accordingly, second base station 110 transmits the enhancement layer sub-stream packets as a unicast transmission to each of client device 112d and client device 112e using a cellular connection.

In a particular embodiment, a user may request the video multicast of their preference to be streamed on their video players. The user may also specify the video quality that he or she would like to view. The user may then be informed that the high quality video will utilize his or her cellular data plan that may incur additional charges. The user may then expect the higher the quality of video received, the more data that will be transmitted via the cellular network, which may incur additional cost on the user's phone bill.

In various embodiments, for those users who select only the base layer quality, their client devices, such as client devices 112a-112c, can begin receiving the base layer sub-stream via the multicast address on the WiFi link of their client devices. Their client devices can decode the base layer and render a video of basic quality to the display of the client device. For those users who select to receive higher quality video, their client devices, such as client devices 112d-112e, can begin receiving the base layer sub-stream via the multicast address on the WiFi link of their devices. In addition, their client devices can also begin requesting the enhancement layer sub-stream through the cellular network, such as through a 3G interface or 4G interface. Upon receiving the base layer sub-stream and the enhancement layer sub-stream, a decoder of the client device combines both the base layer sub-stream and the enhancement layer sub-stream together to decode a high quality video for the user. In particular embodiments, a user may freely opt in and opt out of the high-quality sub-stream over time, depending upon his or her interest in the current content. For instance, a soccer fan may choose to subscribe and pay for the high-quality version of the video stream only when his or her favorite player is controlling the ball.

It should be understood that other payment models may be used within the framework described herein. For instance, the multicast base layer sub-stream may be provided for free, whereas the enhancement layer sub-streams may be available via subscription. In addition to incurring cellular data charges, the user may also need to pay additional compensation, perhaps through a premium membership fee to the stadium, for accessing the enhancement layer sub-streams.

Although the embodiment of FIG. 1 is described as using a base layer sub-stream and an enhancement layer sub-stream, it should be understood that other embodiments may employ more than two sub-streams. When using n>2 enhancement quality layers, users may select k<=n layers, and request that the k-1 enhancement layers be sent via the cellular network. Their respective client devices can combine k-1 enhancement layer sub-streams, along with the base layer sub-stream from the WiFi link, to decode and render a video stream at the chosen quality level.

A particular embodiment may be directed toward heterogeneous devices that have different screen resolutions. For example, a user with a smartphone or other device having a 3-inch or smaller screen may be satisfied with a low spatial resolution, while a user with a tablet device may wish to receive the video at a higher spatial resolution. Since SVC can readily accommodate multiple spatial layers, in a particular embodiment a low screen resolution may be encoded in the base-layer stream, and the enhancement layers may be delegated to represent successively higher screen resolutions. In still other embodiments, some tablet users may prefer to receive only the base layer stream and some smartphone users may prefer to receive the enhancement stream as well.

Figure 2:
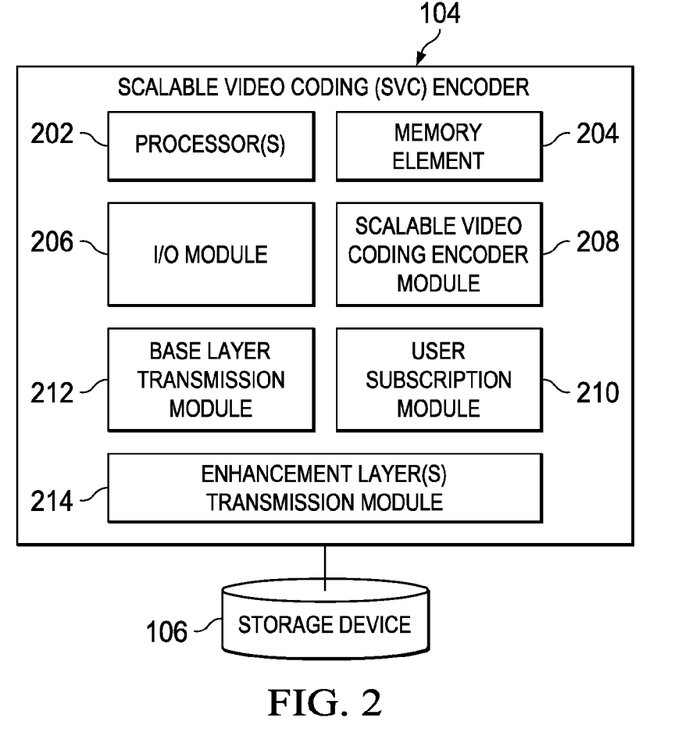
FIG. 2 is a simplified block diagram illustrating possible example details associated with the scalable video coding (SVC) encoder of the communication system of FIG. 1.

Referring now to FIG. 2, FIG. 2 is a simplified block diagram illustrating possible example details associated with scalable video coding (SVC) encoder 104 of communication system 100 of FIG. 1. SVC encoder 104 can include processor(s) 202, a memory element 204, I/O module 206, a scalable video coding (SVC) encoder module 208, a user subscription module 210, a base layer transmission module 212, and an enhancement layer transmission module 214. Processor 202 is configured to execute operations to perform the various functions of SVC encoder 104. Memory element 204 is configured to store data associated with the operation of processor 202. Input/output (I/O) module 206 is configured to perform various data input and output operations associated with SVC encoder 104. SVC encoder module 208 is configured to receive a source video stream and generate a base layer sub-stream and one or more enhancement layer sub-streams using scalable video coding procedures.

User subscription module 210 is configured to maintain user subscription information regarding whether a particular client device 112a-112e is subscribed to receive one or more enhancement layer sub-streams from SVC encoder 104. In at least one embodiment, subscription of a particular client device 112a-112e may be performed by the user of the client device 112a-112e sending a subscription request to SVC encoder 104. Base layer transmission module 212 is configured to transmit the base layer sub-stream to first base station 108 via a multicast transmission protocol. Enhancement layer(s) transmission module 214 is configured to transmit one or more enhancement layer sub-streams to second base station 110 via a unicast transmission protocol.

SVC encoder 104 may be further in communication with storage device(s) 106 and configured to store data associated with SVC encoder 104 such as user subscription information or one or more sub-streams such as a base layer sub-stream and enhancement layer sub-stream. The storage device(s) 106 may also hold video stream sources that can be encoded by the SVC encoder 104 when needed.

Figure 3:
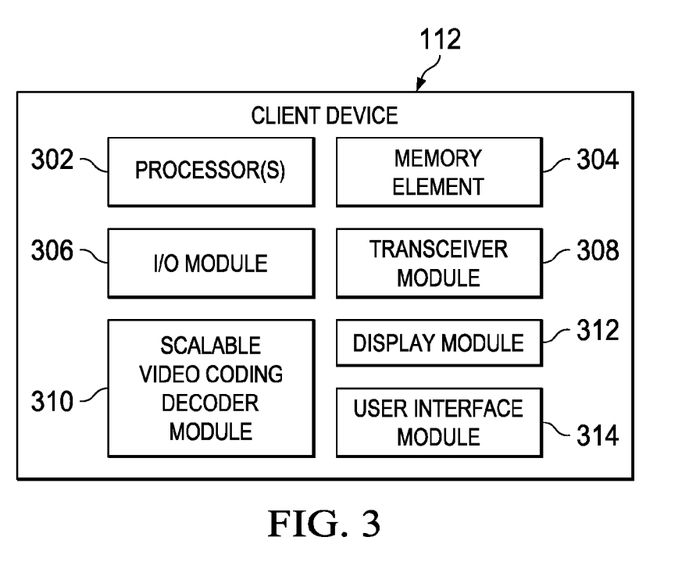
FIG. 3 is a simplified block diagram illustrating possible example details associated with a client device of the communication system.

Referring now to FIG. 3, FIG. 3 is a simplified block diagram illustrating possible example details associated with client device 112 of communication system 100. In at least one embodiment, client device 112 may include any one of client devices 112a-112e. Client device 112 can include processor(s) 302, a memory element 304, an I/O module 306, a transceiver module 308, a scalable video coding (SVC) decoder module 310, a display module 312, and a user interface module 314. Processor 302 is configured to execute operations to perform the various functions of client device 112. Memory element 304 is configured to store data associated with the operation of processor 302. I/O module 306 is configured to perform various data input and output operations associated with client device 112. Transceiver module 308 is configured to wirelessly communicate between client device 112 and first base station 108 and second base station 110.

Scalable video coding (SVC) decoder module 310 is configured to receive base layer sub-stream packets from first base station 109 and optionally packets associated with one or more enhancement layer sub-streams corresponding to the same video frames of the stream and decode them according to the SVC techniques to render an output video stream. The output video stream may then be displayed using display module 312. Display module 312 may include any display screen such as display screens using liquid crystal display (LCD), light emitting diode (LED), plasma, or organic light emitting diode (OLED) display technologies. User interface module 314 is configured to enable a user to provide user inputs to client device 112 such as an indication that a user wishes to receive video associated with an event and/or subscribe to one or more enhancement layer sub-streams associated with the video.

Figure 4:
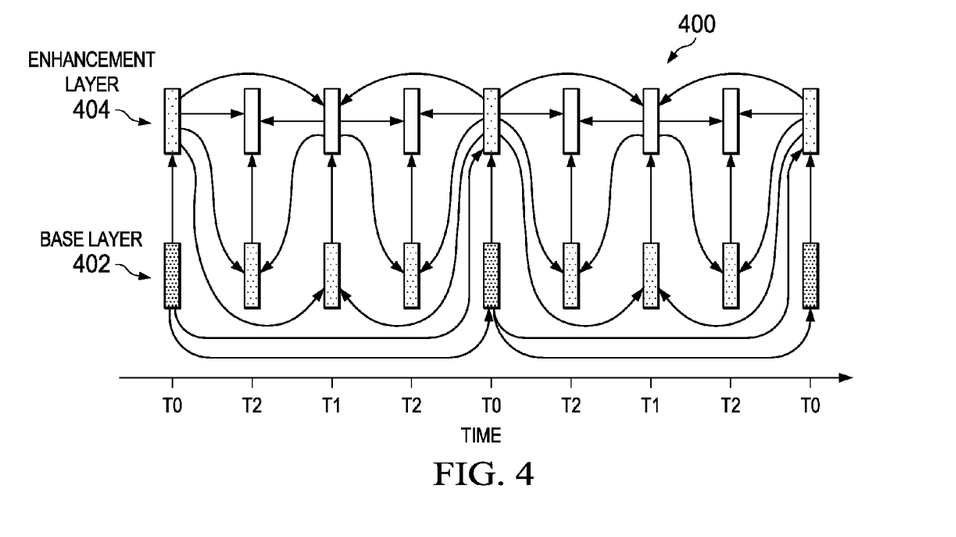
FIG. 4 illustrates an example embodiment of a structure of a scalable video coding (SVC) stream including a base layer sub-stream and an enhancement layer sub-stream.

FIG. 4 illustrates an example embodiment of a structure 400 of a scalable video coding (SVC) stream including a base layer sub-stream 402 and an enhancement layer sub-stream 404. In accordance with one or more embodiments, base layer sub-stream 402 is transmitted using a multicast transmission protocol and enhancement layer sub-stream 404 is transmitted using a unicast transmission protocol. In the example structure 400, the SVC stream has a Group of Picture (GOP) length of four frames. The frames labeled T0 form a first temporal layer, the frames labeled T1 form a second temporal layer, and the frames labeled T2 form a third temporal layer. Each frame is encoded into one base-layer picture of base layer sub-stream 402 and one enhancement layer picture of enhancement layer sub-stream 404.

In the particular embodiment illustrated in FIG. 4, the SVC stream is organized in a hierarchical fashion in which arrows indicate dependency among video frames. In a particular embodiment, first and last frames may be encoded first, and a middle frame may be encoded by referring backwards and forwards to the first and the last. In particular embodiments, a particular frame may include high quality and low quality versions of a video stream for example using temporal similarity as well as content across frames.

Figure 5:
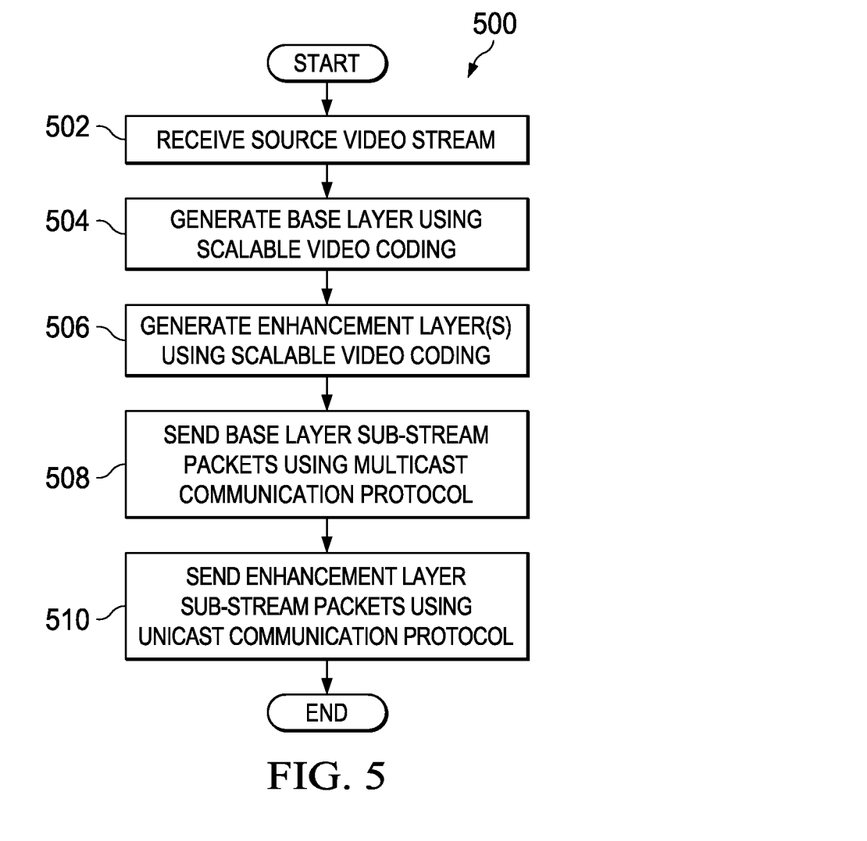
FIG. 5 is a simplified flowchart illustrating one potential embodiment of operations associated with the SVC encoder of the communication system.

FIG. 5 is a simplified flowchart 500 illustrating one potential embodiment of operations associated with SVC encoder 104 of communication system 100. The flow may begin at 502 in which SVC encoder 104 receives a source video stream. In 504, SVC encoder 104 generates a base layer sub-stream using scalable video coding techniques. In 506, SVC encoder 104 generates one or more enhancement layer sub-streams using scalable video coding techniques. In 508, SVC encoder 104 sends the base layer sub-stream packets using a multicast communication protocol to first base station 108. The first base station 108 can in turn transmit the base layer sub-stream packets to one or more client devices 112a-112e with a multicast communication protocol using a first wireless network connection. In a particular embodiment, the first wireless network connection is a WiFi connection. In various embodiments, the base layer sub-stream packets are multicasted or broadcasted to a number of client devices 112a-112e. In various embodiments, with multicasting no acknowledgement is received regarding whether the base layer sub-stream packets were received by the respective client devices 112a-112e.

In 510, SVC encoder 104 sends the enhancement layer sub-stream packets to second base station 110 using a unicast communication protocol. Second base station 110 can in turn transmit the enhancement layer sub-stream packets to one or more of client devices 112d-112e with the unicast communication protocol using a second wireless network connection. In a particular embodiment, the second wireless network connection is a cellular network connection. It should be understood that in various embodiments, sending of the base layer sub-stream packets in 508 and sending of the enhancement layer sub-stream packets in 510 are performed substantially simultaneously with one another by SVC encoder 104 such that these sub-streams are routed onto two parallel network paths at substantially the same time. In other embodiments, the base layer sub-stream and enhancement layer may be sent by at different times by SVC encoder 104. The flow then ends.

In at least one embodiment, unicasting of packets supports the sending of acknowledgement message by client devices 112d-112e in response to receiving a unicast packet. Accordingly, in various embodiments client devices 112d-112e may send an acknowledgement to second base station 110 indicating whether a particular enhancement layer sub-stream packet was received by the respective client device 112d-112e. In such embodiments, second base station 110 determines whether an acknowledgement for reception of enhancement layer sub-stream packets has been received from a particular client device 112*d*-112*e*. If no acknowledgment has been received, second base station 110 determines whether a retry timer indicating a number of acceptable retries for the resending of the unacknowledged enhancement layer packet has expired. If the retry timer has not expired, the enhancement layer sub-stream packet is resent to the particular client device 112*d*-112*e* by second base station 110.

Figure 6:
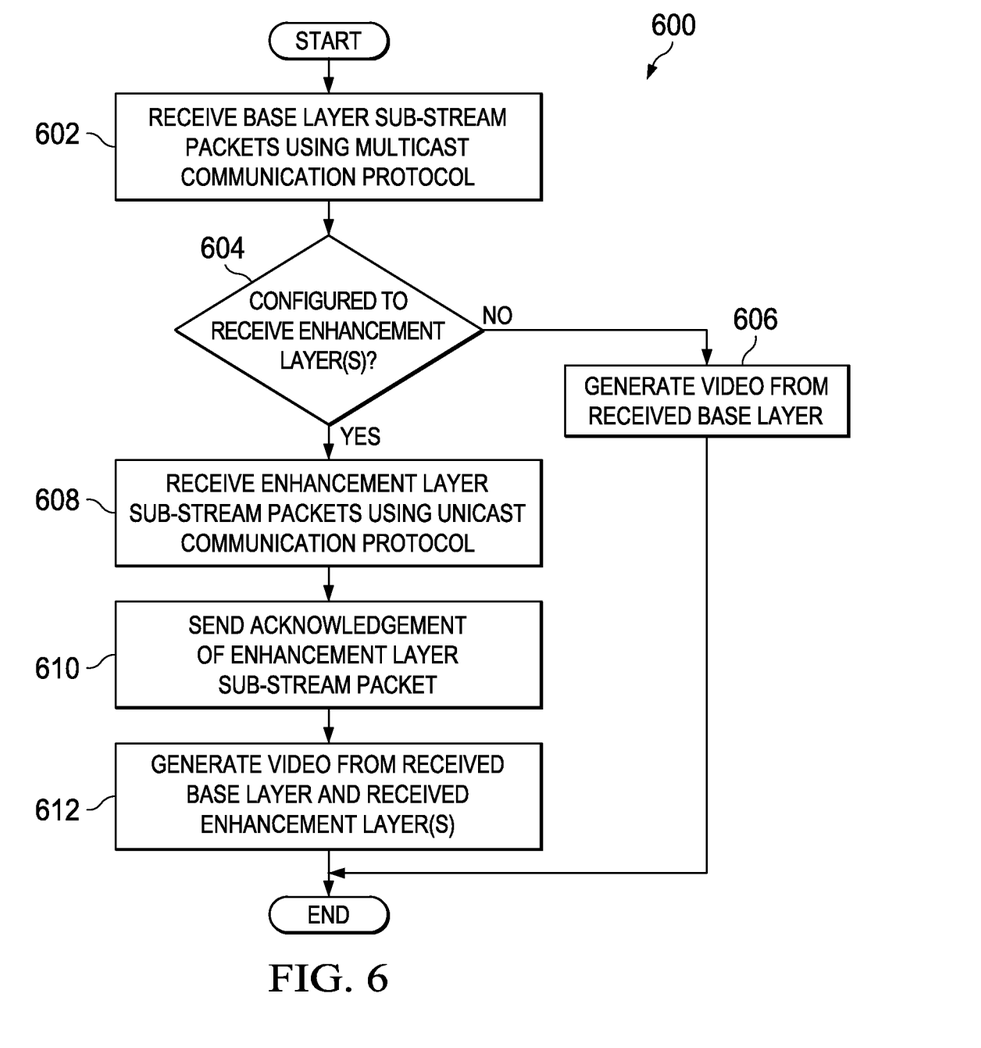
FIG. 6 is a simplified flowchart illustrating one potential embodiment of operations associated with the client device.

FIG. 6 is a simplified flowchart illustrating one potential embodiment of operations associated with client device 114. The flow may begin at 602 in which client device 112 receives a base layer sub-stream packet using a multicast communication protocol from first base station 108. In a particular embodiment, first base station 108 transmits the base layer sub-stream packet to client device 112 using a WiFi network connection. In 604, it is determined whether client device 112 is configured to receive one or more enhancement layer sub-streams. In a particular embodiment, client device 112 is configured to receive one or more enhancement layer sub-streams by a user of client device 112 subscribing to the enhancement layer sub-streams as previously discussed herein. If client device 112 is not configured to receive enhancement layer sub-streams, the flow continues to 606 in which client device generates an output video stream from only the base layer sub-stream using SVC decoding techniques and the procedure ends. The generated output video may be displayed in a display module of client device 112 for viewing by a user and/or stored within client device 112.

If client device 112 is configured to receive one or more enhancement layer sub-streams, the flow continues to 608 in which client device 112 receives enhancement layer sub-stream packets from second base station 110 using a unicast communication protocol. In a particular embodiment, second base station 110 transmits the enhancement layer sub-stream packets to client device 112 using a cellular network connection. In 610, client device 112 sends an acknowledgment of reception of the enhancement layer sub-stream packet to second base station 110. In 612, client device 112 generates an output video stream from the received base layer sub-stream packets and received enhancement layer sub-stream packets and the flow ends. The generated output video may be displayed in the display module 312 of client device 112 for viewing by the user and/or stored within client device 112.

Note that although various embodiments detailed herein describe transmitting the base layer sub-stream using a multicast communication protocol, in still other embodiments any one-to-many or broadcast communication protocol may be used. In addition, although various embodiments describe transmitting the enhancement layer sub-streams using a unicast communication protocol, in still other embodiments any one-to-one communication protocol may be used.

In various example embodiments, one or more of first base station 108 and second base station 110 can include a rate determination module configured to determine a data transmission rate for the base layer sub-stream to best optimize reception of the base layer sub-stream by client devices 112*a*-112*e*. The rate determination module may select a particular multicast rate determined to be the most robust in terms of physical layer coding and modulation rate for subscribed users. The rate determination module may be further configured to determine the data transmission rate for unicast transmission of one or more enhancement layer sub-streams. The rate determination module may select the unicast rate for transmission of enhancement layer sub-streams to be the most robust physical layer coding and modulation rate for a particular client device 112*d*-112*e* associated with an individual user.

In still another embodiment, a broadcast rate for the multicast transmission of the base layer sub-stream may be determined by using the most robust physical modulation rate or technique common to subscribing client devices 112*a*-112*e*. In particular embodiments, this usually results in a quite low data rate of transmission. However, in occasions in which the system may use a higher multicast rate additional enhancement layers may also be multicasted, giving the subscribers higher basic video quality. Those users who would prefer an even better experience can still depend on a paid unicast link to receive even higher enhancement layers.

It should be understood that the multicast transmission rate may be different at various times and depends upon factors such as the locations and receiver qualities of the users. In a particular embodiment, a video application on the user's client device may also automatically enable the unicast link whenever the quality of the multicasted layers fall below a certain predetermined level. In the context of a stadium entertainment use case, the service provider may also deploy more access points (APs) at the more expensive seat sections, thus guaranteeing a higher multicast rate and higher video quality as a premium to users in those seat sections.

Some embodiments may provide one or more of the following advantages of delivering high-quality video to users who are willing to make extra payments, while still providing a basic quality of the same video stream to other interested users via WiFi multicast, offloading data transmission from the cellular infrastructure onto the WiFi infrastructure in high demand environment, while still being able to service users for their varying video quality demands, providing value added features for WiFi+cellular heterogeneous wireless network systems, providing new applications for scalable video coding (SVC) encoding, providing a payment/subscription model for heterogeneous video delivery systems, and providing the ability to service a variety of heterogeneous devices with different display sizes from the same source video.

In one or more embodiments, communication network 100 may represent a series of points or nodes of interconnected communication paths for receiving and transmitting packets of information that propagate through communication system 100. Communication network 100 may offer a communicative interface between data sources and/or hosts and client devices, and may include any local area network (LAN), wireless local area network (WLAN), metropolitan area network (MAN), Intranet, Extranet, WAN, virtual private network (VPN), cellular network, or any other appropriate architecture or system that facilitates communications in a network environment. Communication network 100 may implement a UDP/IP connection and use a TCP/IP communication language protocol in particular embodiments of the present disclosure. However, any other suitable communication protocol for transmitting and receiving data packets within communication system 100 may be implemented.

Video source server 102 and SVC encoder 104 are network elements that facilitate communication between hosts, sources, and or clients in a given network (e.g., for networks such as that illustrated in FIG. 1). As used herein in this Specification, the term 'network element' is meant to encompass routers, switches, gateways, bridges, loadbalancers, firewalls, inline service nodes, proxies, servers, processors, modules, or any other suitable device, component, element, proprietary appliance, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information.

In one implementation, SVC encoder 104 and client devices 112a-112e include software to achieve (or to foster) the providing of video delivery over heterogeneous networks with scalable video coding, as outlined herein in this Specification. Note that in one example, each of these elements can have an internal structure (e.g., a processor, a memory element, etc.) to facilitate some of the operations described herein. In other embodiments, the providing of video delivery over heterogeneous networks with scalable video coding may be executed externally to these elements, or included in some other network element to achieve this intended functionality. Alternatively, SVC encoder 104 and/or client devices 112a-112e may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Note that in certain example implementations, the providing of video delivery over heterogeneous networks with scalable video coding functions outlined herein may be implemented by logic encoded in one or more, non-transitory tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element (as shown in FIG. 2 and FIG. 3) can store data used for the operations described herein. This can include the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2 and FIG. 3] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that can include digital logic, software, code, electronic instructions, or any suitable combination thereof.

In one example implementation, SVC encoder 104 and client devices 112a-112e may include software in order to achieve the providing of video delivery over heterogeneous networks with scalable video coding functions outlined herein. These activities can be facilitated by scalable SVC encoder module 208, user subscription module 210, base layer transmission module 212, enhancement layer(s) transmission module 214, and/or SVC decoder module 310 (where these modules can be suitably combined in any appropriate manner, which may be based on particular configuration and/or provisioning needs). SVC encoder 104 and client devices 112a-112e can include memory elements for storing information to be used in achieving the video delivery activities, as discussed herein. Additionally, SVC encoder 104 and client devices 112a-112e may include a processor that can execute software or an algorithm to perform the video delivery operations, as disclosed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the steps in the preceding flow diagrams illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols (e.g., unicast, multicast, etc.), communication system 100 may be applicable to other protocols and arrangements. Additionally, although communication system 100 has been illustrated with reference to particular elements and operations that facilitate the communication process, these elements and operations may be replaced by any suitable architecture or process that achieves the intended functionality of communication system 100.

What is claimed is:
1. A method, comprising:
receiving a source data stream;
generating a base layer sub-stream from the source data stream;
generating an enhancement layer sub-stream from the source data stream;

communicating the base layer sub-stream to the client device using a first communication protocol, wherein the first communication protocol is one-to-many communication protocol;
receiving a subscription request from the client device during the communicating of the base layer sub-stream to the client device, the subscription request indicative of a selection by a user associated with the client device to subscribe to the enhancement layer sub-stream; and
communicating the enhancement layer sub-stream to the client device during the communicating of the base layer sub-stream using a second communication protocol responsive to the subscription request being indicative of the selection by the user to subscribe to the enhancement layer sub-stream, wherein the second communication protocol is a one-to-one communication protocol.

2. The method of claim 1, wherein the one-to-many communication protocol is a multicast communication protocol.

3. The method of claim 1, wherein the one-to-one communication protocol is a unicast communication protocol.

4. The method of claim 1, wherein the base layer sub-stream is sent to the client device via a first network connection and the enhancement layer sub-stream is sent to the client device via a second network connection.

5. The method of claim 4, wherein the first network connection includes a WiFi connection.

6. The method of claim 4, wherein the second network connection includes a cellular network connection.

7. The method of claim 1, wherein the source data stream includes a video stream.

8. The method of claim 7, wherein a scalable video coding technique is used to generate the base layer sub-stream and the enhancement layer sub-stream from the received video stream.

9. A non-transitory computer-readable medium that includes code for execution and when executed by a processor operable to perform operations comprising:
receiving a source data stream;
generating a base layer sub-stream from the source data stream;
generating an enhancement layer sub-stream from the source data stream;
communicating the base layer sub-stream to the client device using a first communication protocol, wherein the first communication protocol is one-to-many communication protocol;
receiving a subscription request from the client device during the communicating of the base layer sub-stream to the client device, the subscription request indicative of a selection by a user associated with the client device to subscribe to the enhancement layer sub-stream; and
communicating the enhancement layer sub-stream to the client device during the communicating of the base layer sub-stream using a second communication protocol responsive to the subscription request being indicative of the selection by the user to subscribe to the enhancement layer sub-stream, wherein the second communication protocol is a one-to-one communication protocol.

10. The media of claim 9, wherein the one-to-many communication protocol is a multicast communication protocol.

11. The media of claim 9, wherein the one-to-one communication protocol is a unicast communication protocol.

12. The media of claim 9, wherein the base layer sub-stream is sent to the client device via a first network connection and the enhancement layer sub-stream is sent to the client device via a second network connection.

13. The media of claim 9, wherein the source data stream includes a video stream.

14. The media of claim 13, wherein a scalable video coding technique is used to generate the base layer sub-stream and the enhancement layer sub-stream from the received video stream.

15. An apparatus, comprising:
a memory configured to store data,
a processor operable to execute instructions associated with the data, and
a video encoding circuit, the apparatus being configured to:
receive a source data stream;
generate a base layer sub-stream from the source data stream;
generate an enhancement layer sub-stream from the source data stream;
communicate the base layer sub-stream to the client device using a first communication protocol, wherein the first communication protocol is one-to-many communication protocol;
receiving a subscription request from the client device during the communicating of the base layer sub-stream to the client device, the subscription request indicative of a selection by a user associated with the client device to subscribe to the enhancement layer sub-stream; and
communicate the enhancement layer sub-stream to the client device during the communicating of the base layer sub-stream using a second communication protocol responsive to the subscription request being indicative of the selection by the user to subscribe to the enhancement layer sub-stream, wherein the second communication protocol is a one-to-one communication protocol.

16. The apparatus of claim 15, wherein the one-to-many communication protocol is a multicast communication protocol.

17. The apparatus of claim 15, wherein the one-to-one communication protocol is a unicast communication protocol.

18. The apparatus of claim 15, wherein the base layer sub-stream is sent to the client device via a first network connection and the enhancement layer sub-stream is sent to the client device via a second network connection.

19. The apparatus of claim 15, wherein the source data stream includes a video stream.

20. The apparatus of claim 19, wherein a scalable video coding technique is used to generate the base layer sub-stream and the enhancement layer sub-stream from the received video stream.

21. A method, comprising:
receiving, by a client device, a base layer sub-stream generated from a source data stream using a one-to-many communication protocol; and
sending a subscription request by the client device during the receiving of the base layer sub-stream, the subscription request indicative of a selection by a user associated with the client device to subscribe to an enhancement layer sub-stream generated from the source data stream:
receiving the enhancement layer sub-stream generated from the source data stream during the receiving of the base layer sub-stream using a one-to-one communication protocol responsive to the sending of the subscription request; and
generating an output data stream from the received base layer sub-stream and the received enhancement layer sub-stream.

22. The method of claim 21, wherein the one-to-many communication protocol is a multicast communication protocol.

23. The method of claim 21, wherein the one-to-one communication protocol is a unicast communication protocol.

24. The method of claim 21, wherein the base layer sub-stream is received by a client device via a first network connection and the enhancement layer sub-stream is received by the client device via a second network connection.

25. The method of claim 21, wherein the source data stream includes a video stream.

26. The method of claim 25, wherein a scalable video coding technique is used to generate the base layer sub-stream and the enhancement layer sub-stream from the received video stream.

* * * * *